US012602126B2

(12) United States Patent
Kiryu

(10) Patent No.: US 12,602,126 B2
(45) Date of Patent: Apr. 14, 2026

(54) INFORMATION PROCESSING APPARATUS, NON-TRANSITORY COMPUTER READABLE MEDIUM, AND INFORMATION PROCESSING METHOD FOR NON-CONTACT GESTURE-BASED SELECTION

(71) Applicant: FUJIFILM Business Innovation Corp., Tokyo (JP)

(72) Inventor: Shunsuke Kiryu, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 370 days.

(21) Appl. No.: 18/187,793

(22) Filed: Mar. 22, 2023

(65) Prior Publication Data

US 2024/0069664 A1 Feb. 29, 2024

(30) Foreign Application Priority Data

Aug. 29, 2022 (JP) ................................. 2022-136320

(51) Int. Cl.
*G06F 3/041* (2006.01)
*G06F 3/04842* (2022.01)

(52) U.S. Cl.
CPC ........ *G06F 3/0416* (2013.01); *G06F 3/04842* (2013.01); *G06F 2203/04101* (2013.01); *G06F 2203/04806* (2013.01)

(58) Field of Classification Search
CPC .............. G06F 3/0416; G06F 3/04842; G06F 2203/04101; G06F 2203/04806; G06F 3/04812; G06F 3/04886
See application file for complete search history.

(56) References Cited

U.S. PATENT DOCUMENTS

| | | | | |
|---|---|---|---|---|
| 2009/0265670 A1* | 10/2009 | Kim | .................... | G06F 3/04883 |
| | | | | 715/863 |
| 2011/0291985 A1* | 12/2011 | Wakako | .............. | G06F 3/04883 |
| | | | | 345/173 |
| 2013/0271407 A1* | 10/2013 | Yoon | ................... | G06F 3/04842 |
| | | | | 345/173 |
| 2023/0118137 A1* | 4/2023 | Soma | .................. | G06F 3/04886 |
| | | | | 345/173 |

FOREIGN PATENT DOCUMENTS

JP        2015-060303 A        3/2015

* cited by examiner

*Primary Examiner* — Rodney Amadiz
(74) *Attorney, Agent, or Firm* — Oliff PLC

(57) ABSTRACT

An information processing apparatus includes: a processor configured to: acquire a three-dimensional coordinate at which an operation object is detected, the operation object being in an operation space where operation for contactlessly selecting a displayed object is performed; and in response to detecting moving of the three-dimensional coordinate of the detected operation object, the three-dimensional coordinate being moved by a predetermined threshold distance or longer from a predetermined reference position in a depth direction, regard the moving as operation for selecting the object and execute a process for the operation.

14 Claims, 9 Drawing Sheets

INFORMATION PROCESSING APPARATUS, NON-TRANSITORY COMPUTER READABLE MEDIUM, AND INFORMATION PROCESSING METHOD FOR NON-CONTACT GESTURE-BASED SELECTION

CROSS-REFERENCE TO RELATED APPLICATIONS

This application is based on and claims priority under 35 USC 119 from Japanese Patent Application No. 2022-136320 filed Aug. 29, 2022.

BACKGROUND

(i) Technical Field

The present disclosure relates to an information processing apparatus, a non-transitory computer readable medium, and an information processing method.

(ii) Related Art

Japanese Unexamined Patent Application Publication No. 2015-060303 discloses an information processing apparatus including a positional information acquisition unit, a display controller, a movement controller, and a position selection unit. The positional information acquisition unit acquires three-dimensional positional information regarding an instructing object with respect to a touch panel from a remote controller including the touch panel. The display controller moves the cursor on the display screen in accordance with the movement of the instructing object. If the height of the instructing object from the touch panel is equal to or lower than a predetermined lock threshold, the movement controller prohibits the cursor from moving on the display screen. If the instructing object comes in contact with the touch panel in the state where the cursor is prohibited from moving, the position selection unit selects the position of the cursor on the display screen.

SUMMARY

In non-contact operation apparatuses, operation for selecting an object is performed on occasions in such a manner that an operation object such as a finger is kept at the same position for a predetermined time or longer. Since this case involves with a waiting time of a certain time until the selection operation is settled, it takes time as compared with a contact operation apparatus.

Aspects of non-limiting embodiments of the present disclosure relate to an information processing apparatus, a non-transitory computer readable medium, and an information processing method that are enabled to reduce time taken for a non-contact selection operation by keeping an operation object for a predetermined time or longer, as compared with a case where the selection operation is performed.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including: a processor configured to: acquire a three-dimensional coordinate at which an operation object is detected, the operation object being in an operation space where operation for contactlessly selecting a displayed object is performed; and in response to detecting moving of the three-dimensional coordinate of the detected operation object, the three-dimensional coordinate being moved by a predetermined threshold distance or longer from a predetermined reference position in a depth direction, regard the moving as operation for selecting the object and execute a process for the operation.

BRIEF DESCRIPTION OF THE DRAWINGS

An exemplary embodiment of the present disclosure will be described in detail based on the following figures, wherein.

DETAILED DESCRIPTION

Figure 1:
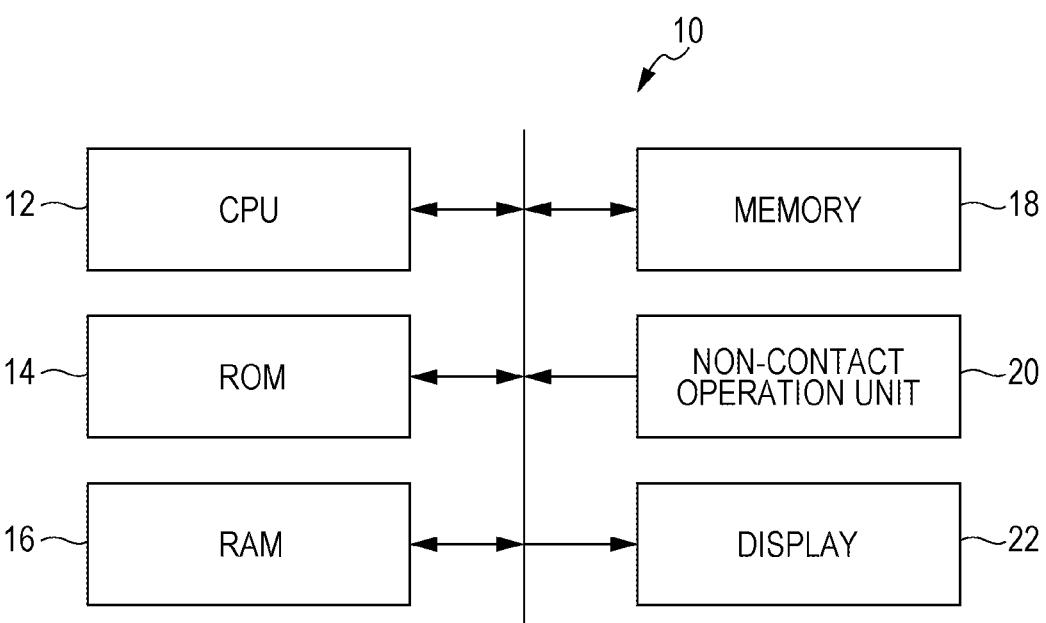
FIG. 1 is a view illustrating the schematic configuration of an information processing apparatus according to this exemplary embodiment.

Hereinafter, an example of an exemplary embodiment of this disclosure will be described in detail with reference to the drawings. FIG. 1 is a view illustrating the schematic configuration of an information processing apparatus according to this exemplary embodiment.

As illustrated in FIG. 1, an information processing apparatus 10 according to this exemplary embodiment includes a central processing unit (CPU) 12, a read only memory (ROM) 14, a random access memory (RAM) 16, a memory 18, a non-contact operation unit 20, and a display 22.

The CPU 12 controls overall operation of the apparatus. The ROM 14 stores information processing programs such as various control programs, various parameters, and the like in advance. The RAM 16 is used as a work area or the like at the time when the CPU 12 runs one of the various programs. The memory 18 stores various pieces of data, application programs, and the like. The memory 18 applies to, for example, a flash memory.

The non-contact operation unit 20 is used to input various pieces of information. In this exemplary embodiment, the non-contact operation unit 20 detects the three-dimensional coordinates of an operation object such as a finger, and the operation of the information displayed on the display 22 is performed with the non-contact operation unit 20. The three-dimensional coordinates of the operation object is detected with the non-contact operation unit 20 by using, for example, a three-dimensional camera, a twin-lens camera, or infrared rays. The operation is performed with a finger in the following description but may be performed with an operation object other than the finger, such as a pen.

The display 22 is used to display various pieces of information and applies to, for example, a liquid crystal panel.

The components above are electrically connected to each other through a system bus. The memory 18 applies to a flash memory as a memory in this exemplary embodiment; however, the memory 18 is not limited to this and may apply to another nonvolatile memory such as a hard disk drive (HDD).

The information processing apparatus 10 is provided in, for example, an image forming apparatus having multiple functions, and the image forming apparatus is operated with the information processing apparatus 10. Examples of the functions of the image forming apparatus include: an image forming function, a reading function, a copying function, a faxing function, a transfer function, and an accumulation function. With the image forming function, various pieces of data are received, and an image forming process based on an appropriate one of the received various pieces of data is executed. With the reading function, a document is read, and image information representing the document is acquired. With the copying function, an image recorded on the document is copied on a sheet. With the faxing function, various pieces of data are transmitted and received through a telephone line (not illustrated). With the transfer function, the document information such as the image information read with the reading function or the like is transferred. With the accumulation function, the document information such as the read image information is accumulated. In the following description, the image forming function is referred to as printing; the reading function, as scanning; and the copying function, as copying, on occasions. The information processing apparatus 10 may be provided in a different apparatus such as an image processing apparatus.

In the following description, a virtual space forming the operation screen of the information processing apparatus 10 is referred to as an operation target space. A selection target in the operation target space is referred to as an object. Real space in which operation is performed of an object in the operation target space is referred to as an operation space. An object to be operated, such as a finger, serving as a coordinate detection target in the operation space is referred to as an operation object. An operation space limit attributable to restriction on the detection device of the non-contact operation unit 20, that is, the limit of a range in which the operation object is detectable in the operation space is referred to as a detection limit. The XY coordinates correspond to the plane of the display 22, and a normal line direction from the plane of the display 22 is a Z direction or a depth direction.

Figure 2:
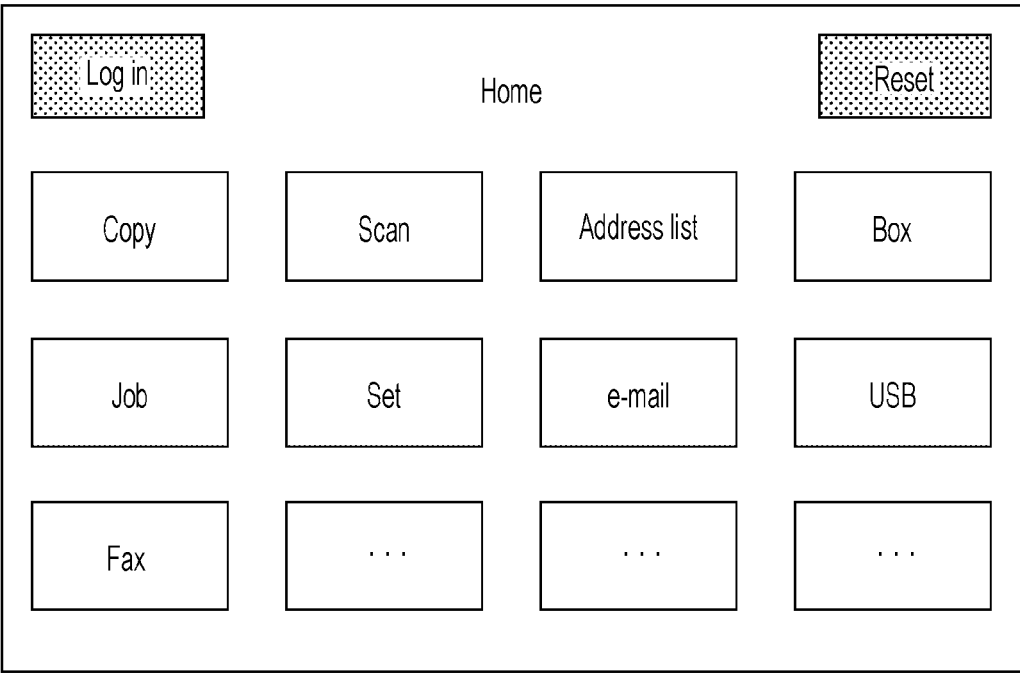
FIG. 2 is a view illustrating an example where objects such as buttons are displayed.
Figure 3:
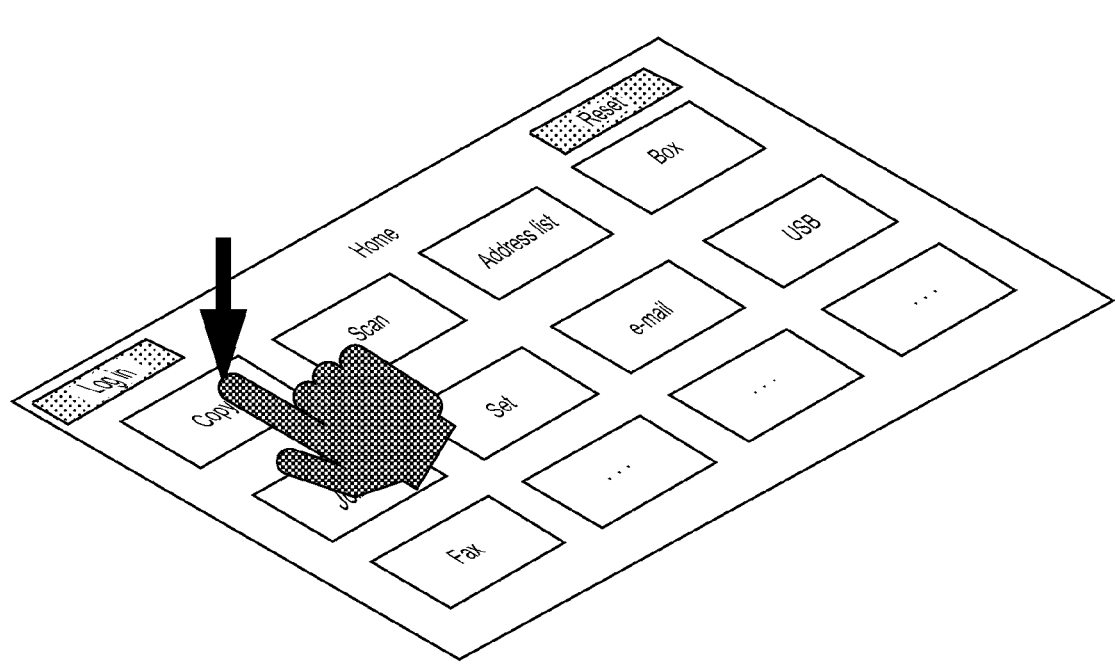
FIG. 3 is a view illustrating a state where an object is pressed with a finger.
Figure 4:
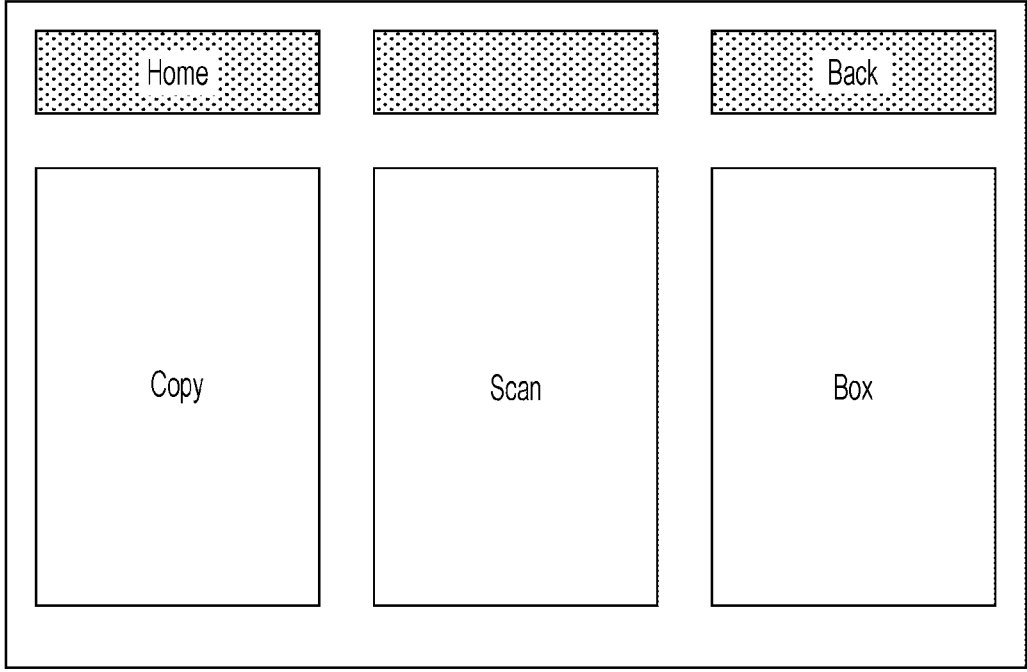
FIG. 4 is a view illustrating an example where a smaller number of objects of a larger size than in the contact operation are displayed.
Figure 5:
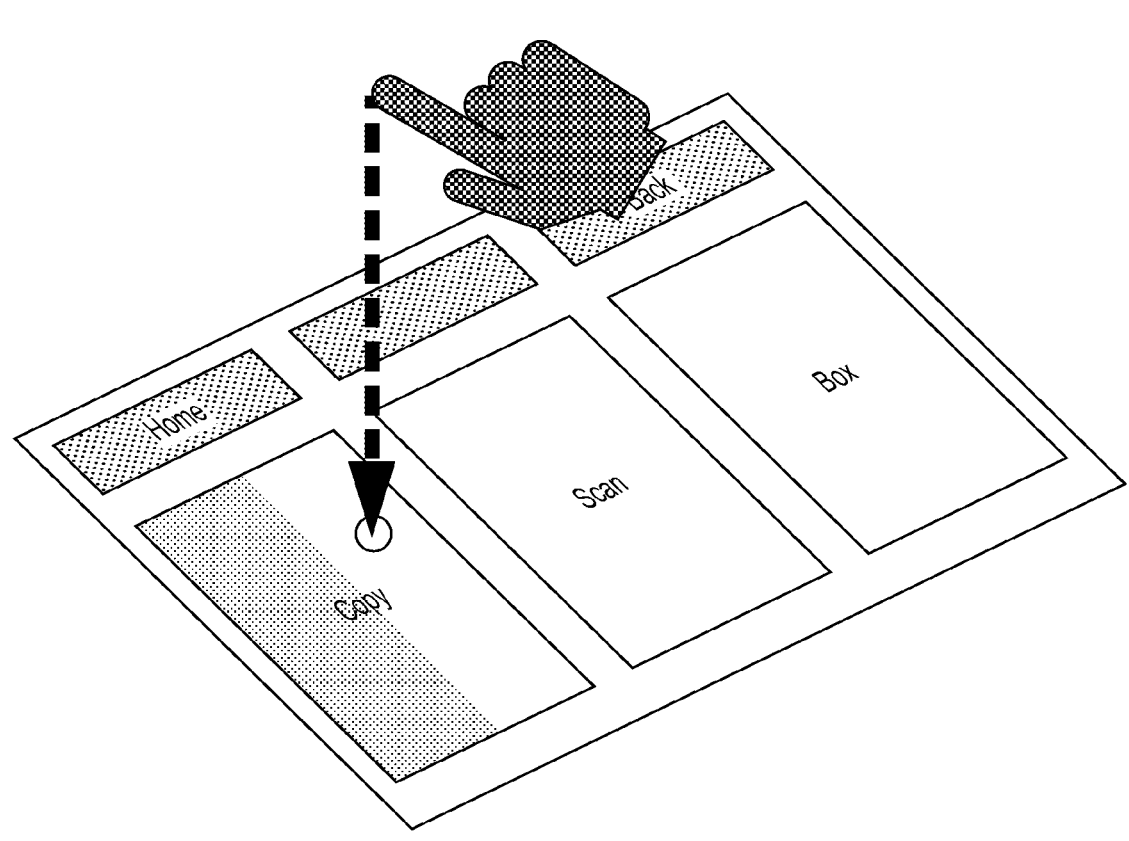
FIG. 5 is a view illustrating a state where hover operation is performed above the object.

In a case where an object is selected through contact operation, for example, with a touch panel or the like, objects such as buttons are displayed as illustrated in FIG. 2, and an object is selected by performing operation corresponding to pressing the object with a finger or the like as illustrated in FIG. 3. In contrast, for non-contact operation in the related art, a smaller number of objects of a larger size than in the contact operation are displayed to prevent misoperation, as illustrated in FIG. 4. To perform an object selection operation, as illustrated in FIG. 5, a hover operation in which the finger is kept hovering at a position corresponding to the object for a predetermined time is performed, and thereby an intended object is selected. FIG. 5 illustrates an example in which the color or the like of the object is gradually changed in accordance with hover time, and the operation is settled when the color of the whole object is changed.

Accordingly, to select a displayed object in the non-contact operation in the related art, the hover operation in which a finger is kept hovering at a position corresponding to a selection target object for a predetermined time is required. The hover operation performed for a predetermined time takes a longer time than pressing a button in the contact operation and thus takes a longer time until an intended operation is completed than in the contact operation. If the selection operation is performed a large number of times until the intended operation is completed, the selection operation requires a particularly longer time. This is stressful to a user and also leads to opportunity loss of a service provider.

In addition, the operation target space is away from the actual operation space in the non-contact operation, and thus an error occurring between a position where the user intends to perform operation and a position actually detected possibly leads to misoperation.

To reduce the misoperation possibility, eleven objects in the operation target space are required to be enlarged in size, but the number of objects are required to be decreased. In this case, the longer operation time matters more notably.

Hence, in the information processing apparatus 10 according to this exemplary embodiment, the CPU 12 acquires three-dimensional coordinates at which the operation object in the operation space is detected. In the operation space, operation for contactlessly selecting a displayed object is performed. If the moving of the three-dimensional coordinates of the detected operation object by a predetermined threshold distance or longer from a predetermined reference position in the depth direction is detected, the CPU 12 regards the moving as the object selection operation and executes a process for the object selection operation.

Figure 6:
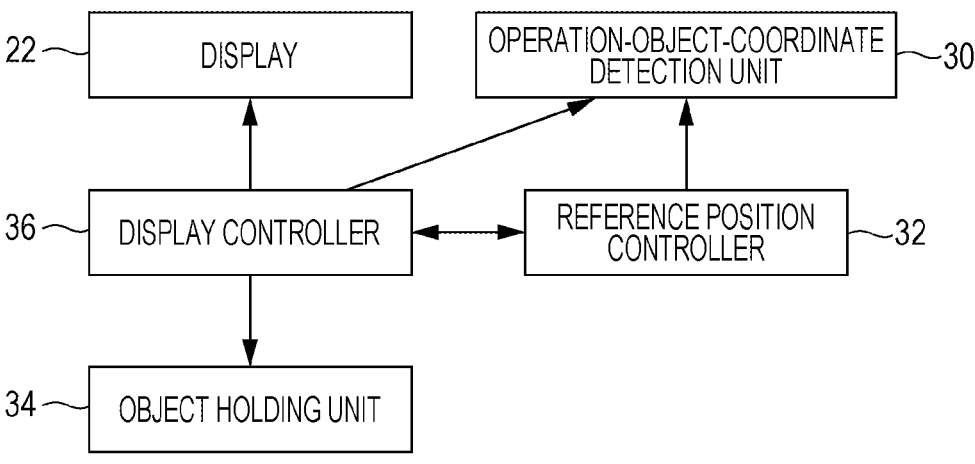
FIG. 6 is a functional block diagram illustrating the functional configuration of the information processing apparatus according to this exemplary embodiment.

The functional configuration of the information processing apparatus 10 according to this exemplary embodiment will then be described. FIG. 6 is a functional block diagram illustrating the functional configuration of the information processing apparatus 10 according to this exemplary embodiment. The functions illustrated in FIG. 6 are implemented in such a manner that the CPU 12 loads one of various information processing programs stored in the ROM 14 and the memory 18 into the RAM 16 and runs the program.

As illustrated in FIG. 6, the information processing apparatus 10 according to this exemplary embodiment has functions as an operation-object-coordinate detection unit 30, a reference position controller 32, an object holding unit 34, and a display controller 36.

The operation-object-coordinate detection unit 30 acquires the three-dimensional coordinates of the operation object detected, for example, in the predetermined operation space above the display 22.

The reference position controller 32 holds the current reference position in the operation space. For example, a first reference position is set from the depth at which the operation object is first detected. The reference position controller 32 resets the reference position in the operation space at the user's discretionary timing. The term "resetting the reference position" denotes, without changing the depth in the operation target space, moving the operation object in the operation space to a certain position and changing the reference position.

The reference position controller 32 detects change or control of the reference position as described below and thereby decides the reference position. For example, the reference position is set from a depth from the operation object at a time point when the operation object is detected after a state where the operation object is not detected. In addition, the depth from the operation object at the time point of moving between levels is also regarded as the reference position.

The user may change the state where the operation object is detected to the state where the operation object is not detected, at any timing. This is referred to as "resetting" of the reference position in this disclosure. Specific implementation examples of will be described later.

The object holding unit 34 holds objects in the operation target space to be displayed to the user and the level relationship of the objects.

The display controller 36 controls objects to be displayed on the display 22 and the pointer on the basis of various pieces of information acquired from the object holding unit 34, the reference position controller 32, and the operation-object-coordinate detection unit 30.

For example, suppose a case where depth from the operation object is changed by a predetermined specific amount from the reference position in a state where an object having a level relationship is selected. If the display controller 36 detects the change, the level is changed to another level in the operation target space. The display controller 36 performs control to display the selected object on the display 22 in such a manner as to zoom in or out the selected object centered at the selected position or the selected object, in accordance with a depth change falling below the specific amount described above.

Note that selecting an object denotes that a state where operation object overlaps with an area including the object at the coordinates when mapping of the XY coordinates of the operation object is performed in the operation target space is regarded as the state where the object is selected.

Figure 7:
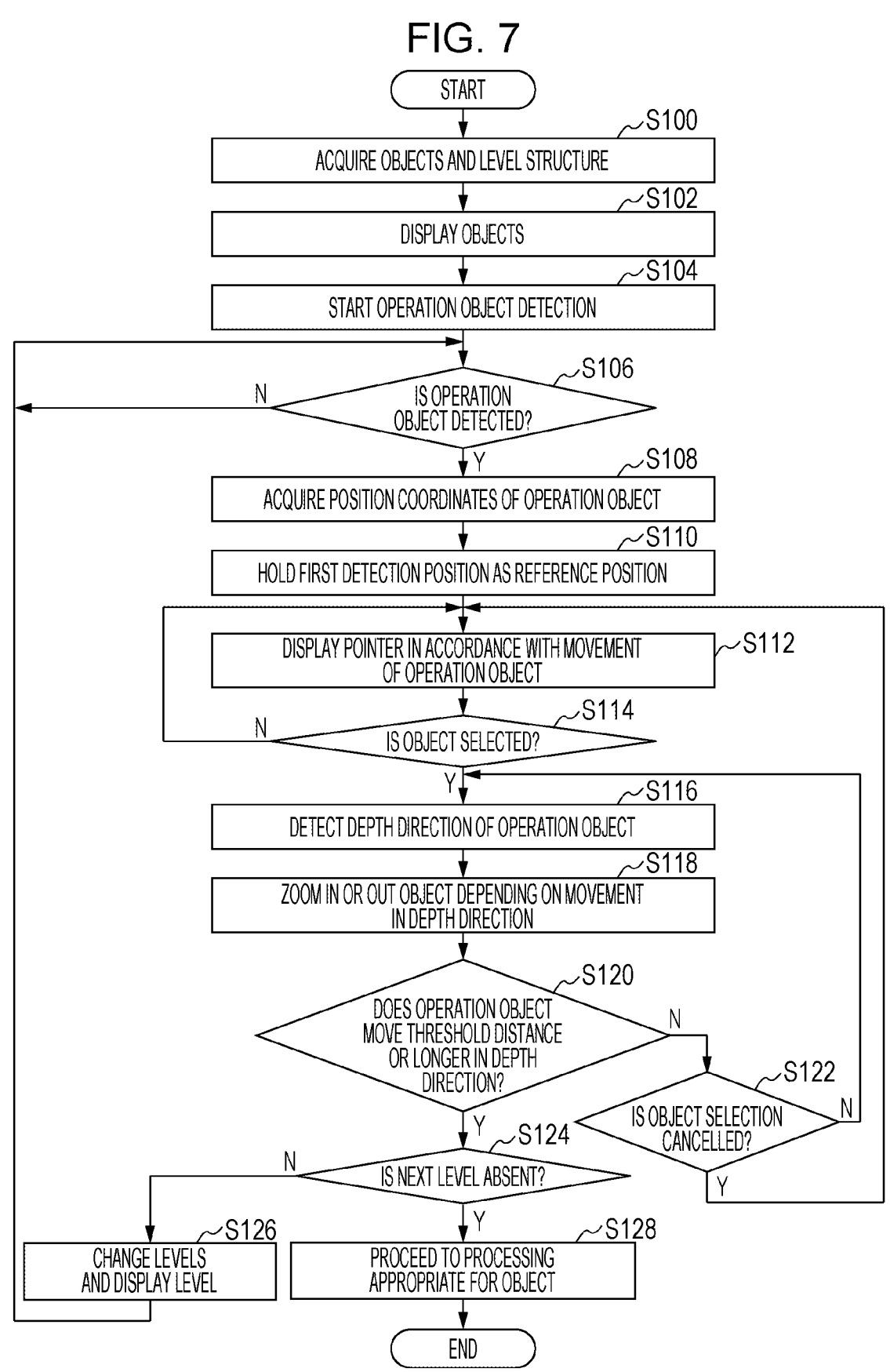
FIG. 7 is a flowchart illustrating an example of specific flow of processing performed by the information processing apparatus according to this exemplary embodiment.

Specific processing performed by the information processing apparatus 10 configured as described above according to this exemplary embodiment will then be described. FIG. 7 is a flowchart illustrating an example of specific flow of processing performed by the information processing apparatus 10 according to this exemplary embodiment. The description is provided on the assumption that the processing in FIG. 7 is respectively started and terminated when the power switch (not illustrated) of the information processing apparatus 10 is on and off.

In step S100, the CPU 12 acquires objects and a level structure thereof and moves to step S102. In other words, the display controller 36 acquires the objects in the operation target space to be displayed to the user and the level relationship of the objects from the object holding unit 34.

In step S102, the CPU 12 displays the objects and moves to step S104. In other words, the display controller 36 displays the objects on the display 22.

In step S104, the CPU 12 starts detecting an operation object and moves to step S106. In other words, the operation-object-coordinate detection unit 30 starts detecting the operation object.

In step S106, the CPU 12 determines whether the operation object is detected. In the determination, the operation-object-coordinate detection unit 30 determines whether the operation object is detected and stands by for an affirmative determination result. In response to the affirmative result, the operation-object-coordinate detection unit 30 moves to step S108.

In step S108, the CPU 12 detects the position coordinates of the operation object and moves to step S110. In other words, the operation-object-coordinate detection unit 30 acquires the position coordinates of the detected operation object.

In step S110, the CPU 12 holds the first detection position of the operation object as the reference position and moves to step S112. In other words, the reference position controller 32 holds the depth at which the operation object is first detected as the first reference position.

In step S112, the CPU 12 displays the pointer in accordance with the operation object and moves to step S114. In other words, the display controller 36 displays, on the display 22, the pointer at a position corresponding the position of the operation object detected by the operation-object-coordinate detection unit 30.

In step S114, the CPU 12 determines whether an object is selected. In the determination, the CPU 12 determines whether the operation object overlaps with an object, that is, in an object selection state. If the determination result is negative, the CPU 12 returns to step S112 and repeats the step described above. If the determination result is affirmative, the CPU 12 moves to step S116.

In step S116, the CPU 12 detects the depth direction of the operation object and moves to step S118.

In step S118, the CPU 12 displays the selected object on the display 22 in such a manner as to zoom in or out the object depending on the movement of the operation object in the depth direction. For example, if the operation object moves in a direction of approaching the object, the CPU 12 zooms in the object. If the operation object moves in a direction of moving away from the object, the CPU 12 zooms out the object.

In step S120, the CPU 12 determines whether the operation object moves a predetermined threshold distance or longer in the depth direction. If the determination result is negative, the CPU 12 moves to step S122. If the determination result is affirmative, the CPU 12 moves to step S124.

In step S122, the CPU 12 determines whether the selection of the object is cancelled. In the determination, the CPU 12 determines whether the operation object moves away from the selected object. If the determination result is negative, the CPU 12 returns to step S116 and repeats the step described above. If the determination result is affirmative, the CPU 12 returns to step S112 and repeats the step described above.

In contrast, in step S124, the CPU 12 determines whether the next level of the object is absent. If the determination result is negative, the CPU 12 moves to step S126. If the determination result is affirmative, the CPU 12 moves to step S128.

In step S126, the CPU 12 changes the levels and displays a level. The CPU 12 returns to step S106 and repeats the step described above.

In contrast, in step S128, the CPU 12 moves to processing appropriate to the selected object and then terminates the series of steps.

Figure 8:
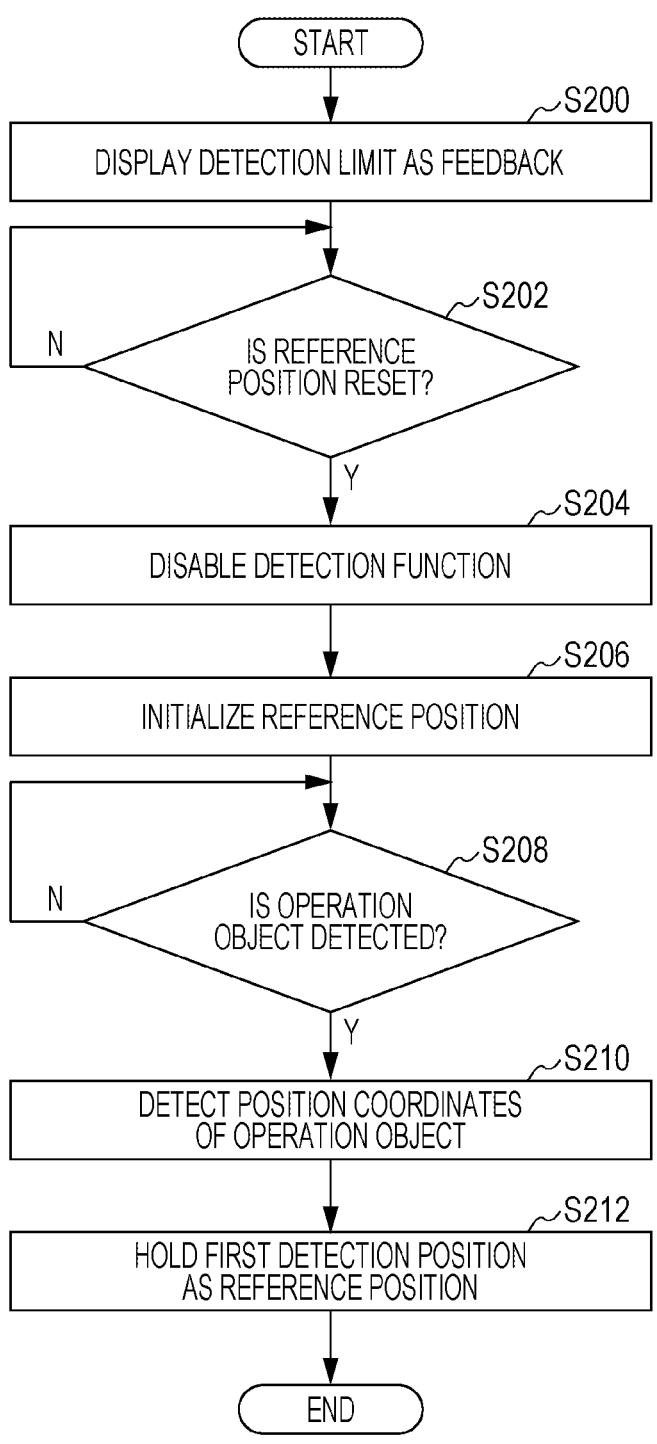
FIG. 8 is a flowchart illustrating an example of processing flow in a case where a user resets a reference position in the operation space at a discretionary timing on the information processing apparatus according to this exemplary embodiment.

Specific processing performed in the case where the user resets the reference position in the operation space at discretionary timing will be then described. FIG. 8 is a flowchart illustrating an example of processing flow in the case where the user resets the reference position in the operation space at discretionary timing on the information processing apparatus 10 according to this exemplary embodiment. The processing in FIG. 8 is started, for example, when the movement of the operation object in the depth direction is detected above the object and the operation object reaches the predetermined detection limit.

In step S200, the CPU 12 displays the detection limit as feedback and moves to step S202. For example, the display controller 36 displays, on the display 22, a message indicating that the operation object reaches the detection limit in the depth direction, an image, or the like.

In step S202, the CPU 12 determines whether the reference position is reset. In the determination, the reference position controller 32 determines whether a predetermined reset operation is performed. The CPU 12 stands by for an affirmative determination result. In response to the affirmative result, the CPU 12 moves to step S204.

In step S204, the CPU 12 disables the operation object detection function and moves to step S206. For example, the CPU 12 disables the operation object detection function for a predetermined time.

In step S206, the CPU 12 initializes the reference position and moves to step S208. In other words, the CPU 12 initializes the reference position held by the reference position controller 32.

In step S208, the CPU 12 determines whether the operation object is detected. The CPU 12 stands by for an affirmative determination result. In response to the affirmative result, the CPU 12 moves to step S210.

In step S210, the CPU 12 detects the position coordinates of the operation object and moves to step S212.

In step S212, the CPU 12 holds the first detection position as the reference position and terminates the series of steps.

Figure 9:
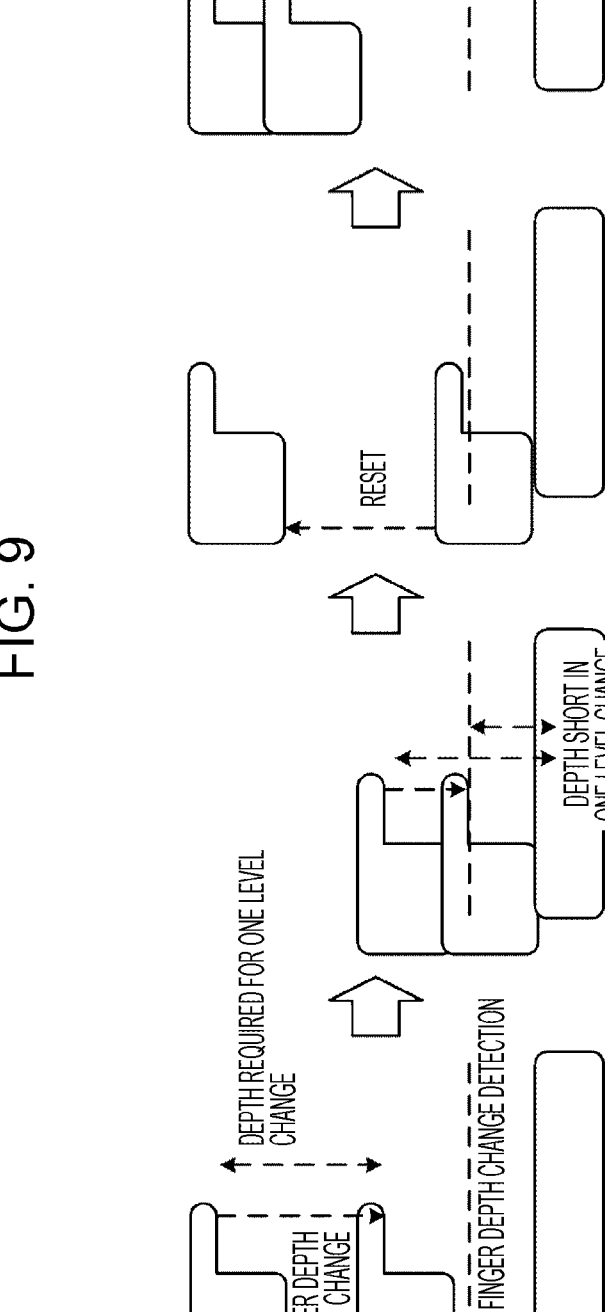
FIG. 9 is a view illustrating an example of resetting the reference position.

Performing the processing as described above causes the level to move to an intended level by performing the reset operation in the following case, as illustrated in FIG. 9: the finger is moved to another level by a depth required for one level change and reaches the depth detection limit after being further moved in the depth direction, but the depth is short for the one level change.

A specific example of implementing the reference position resetting described above will be described. An example where the resetting is performed in response to the detection limit in the direction of approaching the display 22 is hereinafter described; however, the same holds true for a detection limit in the direction of moving away from the display 22.

If the selection operation for an intended operation is performed a large number of times, that is, if there are a large number of levels, it is conceivable that the operation object reaches the detection limit in the operation space before all of the operations are completed. In this case, to reach a deeper level, the reference position serving as the start position for the depth operation is required to be reset.

A conceivable one of examples of implementing the resetting is setting, as a new reference position, the coordinates at the time point after the operation object is moved to a certain position while the detection function is being disabled and when the detection function is enabled again.

In this case, for example, the detection function is disabled for a predetermined time in response to a hover operation at the detection limit for a predetermined time, in response to reaching the detection limit, or in response to detecting a predetermined gesture, and the detection function is disabled while a different finger is detected in a predetermined area.

A conceivable another example of implementing the resetting is initializing the reference position in response to a predetermined operation of moving the finger to a certain position.

In this case, the reference position is initialized, for example, in a case where: the depth is changed to move the operation object upward at a predetermined moving speed; operation for changing the depth to move the operation object upward is completed after the changing is detected; and the finger is moved to the outside of the detection range to prevent the depth from being changed.

In the exemplary embodiment above, the object is zoomed in or out depending on the movement of the operation object in the depth direction; however, the displaying is not limited to this. For example, a displaying form such as the color or the like of the selected object may be gradually changed in accordance with the movement of the operation object in the depth direction. For example, in the case where the operation object is moved in the direction of approaching an object, the operation object may displayed in a darker color as the operation object becomes closer to the object. The operation object may displayed in a lighter color as the operation object becomes distant.

In the embodiments above, the CPU is taken as an example of a processor. The term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The processing performed by the information processing apparatus 10 according to the exemplary embodiment may be processing performed by software, hardware, or combination of these. The processing performed by the information processing apparatus 10 may be distributed in such a manner as to be stored as a program in a recording medium.

The present disclosure is not limited to the exemplary embodiment described above. It goes without saying that the exemplary embodiment may be implemented in such a manner as not only described above but also to be modified variously without departing from the spirit of the disclosure.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

There is provided an information processing apparatus including:

a processor configured to:

acquire a three-dimensional coordinate at which an operation object is detected, the operation object being in an operation space where operation for contactlessly selecting a displayed object is performed; and in response to detecting moving of the three-dimensional coordinate of the detected operation object, the three-dimensional coordinate being moved by a predetermined threshold distance or longer from a predetermined reference position in a depth direction, regard the moving as operation for selecting the object and execute a process for the operation.

(((2)))

In the information processing apparatus according to (((1))), the processor is configured to: set, as the reference position, depth from the operation object at a time point when the operation object is detected after a state where the operation object is not detected.

(((3)))

In the information processing apparatus according to (((1))) or (((2))), the processor is configured to: set, as a next reference position, depth from the operation object at a time point of moving between levels of the object after the operation for selecting the object.

(((4)))

In the information processing apparatus according to any one of (((1))) to (((3))), the processor is configured to: zoom in or out the selected object centered at a selected position or at the selected object in accordance with a change in the depth direction of the operation object.

(((5)))

In the information processing apparatus according to according to any one of (((1))) to (((4))), the processor is configured to: in response to moving the operation object while a detection function of detecting the operation object is being disabled and then in response to the detection function being enabled again, set, as a new reference position, a position of the operation object after the moving.

(((6)))

In the information processing apparatus according to (((5))), the processor is configured to: in response to detecting a hover operation kept at a predetermined detection limit for a predetermined time or longer, the hover operation corresponding to keeping the operation object hovering for a predetermined time, or in response to detecting the moving of the operation object at the detection limit, disable the detection function for a predetermined time.

(((7)))

In the information processing apparatus according to (((5))), the processor is configured to: in response to the operation object reaching a predetermined detection limit, disable the detection function for a predetermined time.

(((8)))

In the information processing apparatus according to (((5))), the processor is configured to: in response to detecting a different operation object in a predetermined area, disable the detection function.

(((9)))

In the information processing apparatus according to (((5))), the processor is configured to: in response to detecting a predetermined gesture, disable the detection function for a predetermined time.

(((10)))

In the information processing apparatus according to according to any one of (((1))) to (((4))), the processor is configured to: in response to a predetermined operation for moving the operation object to a certain position, change the reference position.

(((11)))

In the information processing apparatus according to (((10))), the processor is configured to: in response to changing depth from the operation object to move the operation object upward at a predetermined moving speed, the changing serving as the predetermined operation, change the reference position.

(((12)))

In the information processing apparatus according to (((10))), in response to completing operation for changing depth from the operation object to move the operation object upward after detecting the changing, the completing serving as the predetermined operation, change the reference position.

(((13)))

In the information processing apparatus according to (((10))), the processor is configured to: in response to moving the operation object to outside of a detection range to prevent depth from the operation object from being changed, the moving serving as the predetermined operation, change the reference position.

(((14)))

There is provided an information processing program causing a computer to execute a process for information processing, the process including:

acquiring acquire a three-dimensional coordinate at which an operation object is detected, the operation object being in an operation space where operation for contactlessly selecting a displayed object is performed; and in response to detecting moving of the three-dimensional coordinate of the detected operation object, the three-dimensional coordinate being moved by a predetermined threshold distance or longer from a predetermined reference position in a depth direction, regarding the moving as operation for selecting the object and executing a process for the operation.

What is claimed is:

1. An information processing apparatus comprising:

a processor configured to:

acquire a three-dimensional coordinate at which an operation object is detected, the operation object being in an operation space where operation for contactlessly selecting a displayed object is performed;

in response to detecting moving of the three-dimensional coordinate of the detected operation object, the three-dimensional coordinate being moved by a predetermined threshold distance or longer from a predetermined reference position in a depth direction, regard the moving as operation for selecting the object and execute a process for the operation; and set, as the reference position from which the predetermined threshold distance is measured, depth from the operation object at a time point when the operation object is detected after a state where the operation object is not detected.

2. The information processing apparatus according to claim 1, wherein the processor is configured to: set, as a next reference position, depth from the operation object at a time point of moving between levels of the object after the operation for selecting the object.

3. The information processing apparatus according to claim 1, wherein the processor is configured to: zoom in or out the selected object centered at a selected position or at the selected object in accordance with a change in the depth direction of the operation object.

4. The information processing apparatus according to claim 1, wherein the processor is configured to: in response to moving the operation object while a detection function of detecting the operation object is being disabled and then in response to the detection function being enabled again, set, as a new reference position, a position of the operation object after the moving.

5. The information processing apparatus according to claim 4, wherein the processor is configured to: in response to detecting a hover operation kept at a predetermined detection limit for a predetermined time or longer, the hover operation corresponding to keeping the operation object hovering for a predetermined time, or in response to detecting the moving of the operation object at the detection limit, disable the detection function for a predetermined time.

6. The information processing apparatus according to claim 4, wherein the processor is configured to: in response to the operation object reaching a predetermined detection limit, disable the detection function for a predetermined time.

7. The information processing apparatus according to claim 4, wherein the processor is configured to: in response to detecting a different operation object in a predetermined area, disable the detection function.

8. The information processing apparatus according to claim 4, wherein the processor is configured to: in response to detecting a predetermined gesture, disable the detection function for a predetermined time.

9. The information processing apparatus according to claim 1, wherein the processor is configured to: in response to a predetermined operation for moving the operation object to a certain position, change the reference position.

10. The information processing apparatus according to claim 9, wherein the processor is configured to: in response to changing depth from the operation object to move the operation object upward at a predetermined moving speed, the changing serving as the predetermined operation, change the reference position.

11. The information processing apparatus according to claim 10, wherein the processor is configured to: in response to completing operation for changing depth from the operation object to move the operation object upward after detecting the changing, the completing serving as the predetermined operation, change the reference position.

12. The information processing apparatus according to claim 9, wherein the processor is configured to: in response to moving the operation object to outside of a detection range to prevent depth from the operation object from being changed, the moving serving as the predetermined operation, change the reference position.

13. A non-transitory computer readable medium storing a program causing a computer to execute a process for information processing, the process comprising:

acquiring a three-dimensional coordinate at which an operation object is detected, the operation object being in an operation space where operation for contactlessly selecting a displayed object is performed;

in response to detecting moving of the three-dimensional coordinate of the detected operation object, the three-dimensional coordinate being moved by a predetermined threshold distance or longer from a predetermined reference position in a depth direction, regarding the moving as operation for selecting the object and executing a process for the operation; and setting, as the reference position from which the predetermined threshold distance is measured, depth from the operation object at a time point when the operation object is detected after a state where the operation object is not detected.

14. An information processing method comprising:

acquiring a three-dimensional coordinate at which an operation object in an operation space where operation for selecting a displayed object contactlessly is performed is detected;

in response to detecting moving of the three-dimensional coordinate of the detected operation object, the three-dimensional coordinate being moved by a predetermined threshold distance or longer from a predetermined reference position in a depth direction, regarding the moving as operation for selecting the object and executing a process for the operation; and setting, as the reference position from which the predetermined threshold distance is measured, depth from the operation object at a time point when the operation object is detected after a state where the operation object is not detected.

* * * * *